J. RAU.
FOOD COOKER.
APPLICATION FILED FEB. 7, 1911.
1,011,080.
Patented Dec. 5, 1911.
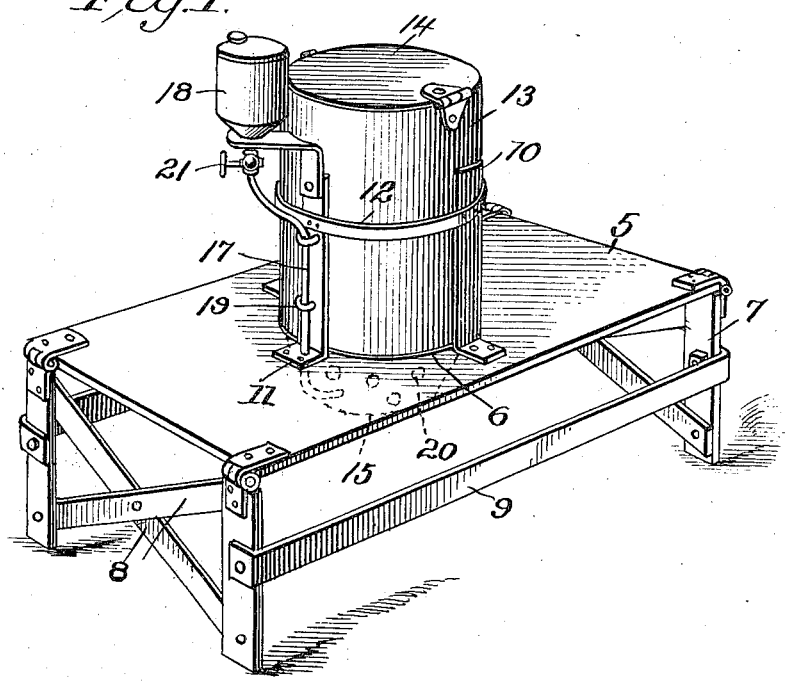
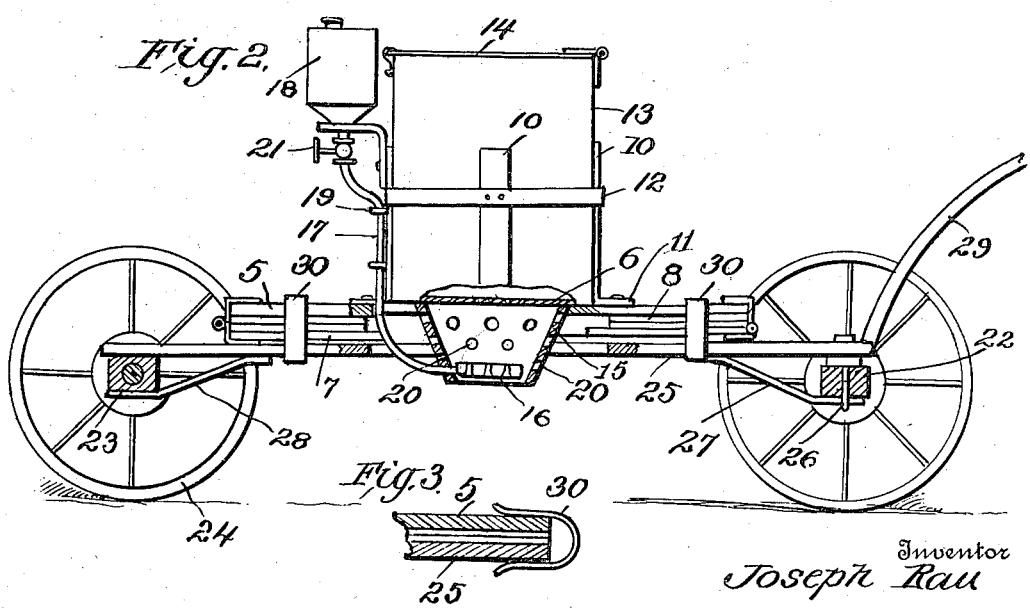
Witnesses
W. N. Woodson
Juana M. Fallin
Inventor
Joseph Rau
By H. A. M. Lacey, Attorneys.

UNITED STATES PATENT OFFICE.

JOSEPH RAU, OF FAYETTE, IOWA.

FOOD-COOKER.

1,011,080.  Specification of Letters Patent.  Patented Dec. 5, 1911.

Application filed February 7, 1911. Serial No. 607,081.

*To all whom it may concern:*

Be it known that I, JOSEPH RAU, a citizen of the United States, residing at Fayette, in the county of Fayette and State of Iowa, have invented certain new and useful Improvements in Food-Cookers, of which the following is a specification.

This invention relates to portable cookers and has for its object the provision of a comparatively simple and thoroughly efficient device of this character, especially designed for cooking feed for hogs and other live stock.

A further object is to provide a cooker capable of being readily mounted on a truck and transported from place to place or used as a stationary cooker.

A further object is to provide a cooker including a supporting base or table having a holder rigidly secured thereto and adapted to receive a food container, there being a burner supported on the base beneath the container for heating the contents thereof.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a feed cooker constructed in accordance with my invention, showing the same used as a stationary cooker; Fig. 2 is a side elevation partly in section, showing the legs folded beneath the supporting table and the latter mounted on a truck for use as a portable cooker; Fig. 3 is a transverse sectional view, showing the construction of the clip for holding the supporting table on the platform of a truck during transportation or shipment.

Corresponding and like parts are referred to in the following description and indicated in all the views of the drawings by the same reference characters.

The improved cooker forming the subject matter of the present invention comprises a supporting base or table 5, preferably rectangular in shape, as shown, and having its central portion provided with an opening 6. Pivotally mounted on the opposite ends of the table 5, are depending supporting legs 7 connected by diagonally disposed braces 8 and longitudinal bars 9, said longitudinal bars being detachably secured to the legs 7 so that by removing the bars 9 and folding said legs inwardly and upwardly against the bottom of the table 5, the cooker may be mounted on a truck and conveniently transported from place to place.

Mounted on the table 5 at the opening 6, is a holder including spaced upright bars 10 having their lower ends provided with attaching lips 11 for engagement with the table 5, and their upper ends connected by a reinforcing hoop 12, said holder being adapted to receive and support a cylindrical container, indicated at 13. The bottom of the container 13 extends across the opening 6 in the table, while the upper end thereof is normally closed by a removable lid or cover 14.

Depending from the bottom of the table 5, is a substantially conical shaped casing 15 having its lower end open and in which is mounted a hydro-carbon burner 16 of any suitable construction for the purpose of heating the contents of the container 13. Extending parallel with the container 13, is a pipe or conductor 17 having its upper end connected with an oil supply tank 18 and its lower end extended through suitable eyes or keepers 19 and thence through an opening in the table 5 for connection with the burner 16. The casing 15 is provided with a series of perforations 20 for supplying air to the burner, one of said perforations receiving the oil conductor 17.

When the device is used as a stationary cooker, the supporting legs 7 are connected by the longitudinal bars 9 so as to form a rigid support for the table and food container. The food is then placed in the container and the valve 21 opened, thus allowing the fuel from the supply tank 18 to flow to the burner, the latter being subsequently lighted through the open end of the casing 15, as will be readily understood.

When it is desired to use the device as a portable cooker, a novel form of truck, indicated in Fig. 2 of the drawings is employed. The truck comprises front and rear axles 22 and 23 having ground wheels 24 mounted thereon and provided with bolsters on which is mounted a platform 25. The front axle 22 is connected with the adjacent bolster by a king bolt 26, to the lower end of which is secured a brace 27 having its rear end fastened to the bottom of the platform 25, thus permitting the front axle to swing on the king bolt and make relatively short turns. The rear axle 23 is reinforced and strengthened by the provision of inclined braces 28 which extend upwardly and are fastened to the platform 25, there being a suitable operating handle or bail 29 connected with the front axle by means of which the device may readily be transported from place to place.

When the device is used as a portable cooker, the longitudinal connecting bars 9 are removed and the supporting legs 7 swung upwardly and inwardly against the bottom of the table 5, and the latter placed in position on the platform 25. Suitable U-shaped bolts or clips 30 are then passed over the adjacent longitudinal edges of the table 5 and platform 25 so as to hold the table in position on the platform when transferring the cooker from one portion of a field to another.

It is obvious that by removing the clips 30 and swinging the legs 7 downwardly and connecting said legs by the bars 9, the device may readily be converted into a stationary cooker. If desired, however, the supporting legs 7, instead of being pivotally connected with the table 5 may be bolted or otherwise rigidly secured thereto, in which event, the legs instead of being folded inwardly and upwardly against the bottom of the table, are entirely detached from the table before placing said cooker in position on the truck.

The device is extremely simple in construction and may be manufactured and placed on the market at a comparatively small initial cost.

Having thus described the invention, what is claimed as new is:

1. The combination with a wheeled truck including a platform, of a cooker comprising a table resting on the platform and provided with folding legs interposed between the bottom of the table and the top of the platform, a holder mounted on said table, a food container seated in the holder, a burner disposed beneath the food container, and clips embracing the adjacent longitudinal edges of the table, platform and said folding legs for retaining the table in position on said platform.

2. The combination with a wheeled truck including a platform having an opening therein, of a cooker comprising a table having an opening registering with the opening in the platform and provided with inwardly and upwardly folding legs adapted to rest on said platform, a holder secured to the upper surface of the table, a food container seated in the holder, a perforated casing depending from the table and extending through the opening in the platform, a burner arranged within the casing, a fuel supply tank, and a pipe having its upper end connected with the supply tank and its lower end extended through the table and platform and thence through one of the perforations in the casing for attachment to the burner.

In testimony whereof, I affix my signature in presence of two witnesses.

JOSEPH RAU. [L. S.]

Witnesses:
O. W. STEVENSON,
WALTER FISH.